United States Patent [19]

Armour et al.

[11] 4,076,484
[45] Feb. 28, 1978

[54] INJECTION-BLOW MOLDING MACHINE HAVING NON-SPLITTING INJECTION AND BLOW MOLDS

[75] Inventors: Donald F. Armour, Bloomfield, Conn.; Bernie A. Olmsted, East Longmeadow, Mass.

[73] Assignee: Hercules Incorporated, Wilmington, Del.

[21] Appl. No.: 630,745

[22] Filed: Nov. 10, 1975

[51] Int. Cl.² ............................................. B29D 23/03
[52] U.S. Cl. ................................... 425/525; 425/533; 425/537
[58] Field of Search ..................... 425/242 B, 388, 812, 425/DIG. 232, DIG. 209, DIG. 204, 525, 533, 537

[56] References Cited

U.S. PATENT DOCUMENTS

| | | | |
|---|---|---|---|
| 3,408,691 | 11/1968 | Ruekberg | 425/DIG. 209 |
| 3,694,124 | 9/1972 | Saumsiegle | 425/242 B |
| 3,717,430 | 2/1973 | Hansen | 425/388 |
| 3,739,052 | 6/1973 | Ayres et al. | 425/388 |
| 3,817,678 | 6/1974 | Armour | 425/DIG. 232 |
| 3,887,316 | 6/1975 | Hestehave | 425/242 B |

*Primary Examiner*—Richard B. Lazarus
*Attorney, Agent, or Firm*—McCormick, Paulding & Huber

[57] ABSTRACT

An injection-blow molding machine is provided with non-splitting injection and blow molds mounted in stationary relationship on a first platen with the axes of the molds parallel with each other and with a spindle situated equidistant from the molds. Parison pins which cooperate with the two molds are mounted on a second movable platen connected to the end of the spindle and are inserted and withdrawn from the molds as the spindle and the second platen are reciprocated toward and away from the molds. The second platen is also rotatable about the spindle axis to permit the parison pins to be indexed between the injection and blow molds so that parisons can be formed in the injection mold and transferred to the blow mold where a final article such as a container is formed. Neckring segments are mounted on the second platen in cooperative relationship with the parison pins to form the neck portion of a container, and the neckring segments include projecting portions which mate with annular grooves around the mouth of the blow mold to define a shoulder of the blown container between the mouth of the non-splitting mold and the neck of the container.

16 Claims, 13 Drawing Figures

INJECTION-BLOW MOLDING MACHINE HAVING NON-SPLITTING INJECTION AND BLOW MOLDS

BACKGROUND OF THE INVENTION

The present invention relates to injection-blow molding machines and is concerned more particularly with a machine in which the parison and the container are removed from their respective molds without splitting the molds.

It is now a well known and widely used industry practice to form containers and the like in injection-blow molding processes in which a parison is initially formed by injecting a settable plastic over a parison pin in an injection mold and then transferring the parison in a softened state to a blow mold where the parison is expanded by air to the final form of the container. One such injection-blow molding machine is disclosed in U.S. Pat. No. 3,816,050 entitled Neckring Mechanism for Plastic Injection Blow Molding Machine having the same assignee as the present invention. In the patented machine, both the injection and blow molds split along a central plane passing through the vertical axis of the parison and container. During a molding operation, the mold halves must be clamped together or "locked up" with clamping pressures sufficient to prevent the formation of flashing on the vertical side walls of the finished article where labels or identifying information are usually placed or printed.

One approach to the flashing problem is utilized in the present invention and consists of designing the blow mold so that the parting plane of the machine is situated perpendicular to the vertical container axis at a portion of the blown container other than the vertical sides and thus a smooth vertical surface is provided where labels or printing are applied. In such design, the blow mold need not split along a vertical plane to release containers having transverse cross sections equal to or smaller than the mouth of the mold and several additional advantages are obtained. With a non-splitting mold, more cavities of simpler construction can be located within a given space and, therefore, a more compact machine is produced. Furthermore, a more uniform temperature distribution within the mold can be obtained since the number of pieces defining the mold cavity can be reduced. It is also easier to develop a more uniform wall thickness in the finished container since air displaced from the cavity during a blowing operation can be more easily controlled. In general, the molding machine and its operation are improved by the use of a non-splitting mold.

In U.S. Pat. No. 3,694,124, an injection-blow molding machine is disclosed in which the axes of the mold cavities and the finished container are located perpendicular to the basic parting line of the molding machine; however, the blow mold is nevertheless formed by mold segments which split during each cycle of the machine to permit the blown container to be extracted. Therefore, although the general arrangement of the machine is similar to that suggested above, the general problems of flashing or mold impressions on the finished particle are not addressed.

It is, accordingly, a general object of the present invention to provide injection-blow molding machine in which the blow mold as well as the injection mold are non-splitting mold components.

SUMMARY OF THE INVENTION

The present invention resides in an injection-blow molding machine in which a parison is formed by injection molding and then the parison is expanded into a finished container by blow molding.

The machine includes an injection mold and a blow mold mounted in stationary relationship within the machine with the mold axes in parallel relationship with each other and a machine axis. The mold axes are located equidistant from the machine axis, and the mold cavities have mouths opening in the same direction at the same general station along the axes. The sidewalls of the mold cavities are shaped so that the transverse cross sections of the cavities as each point along the mold axes are no larger than the other transverse cross sections lying between the individual sections and the mouth of the cavity. A parison or cosntainer can then be withdrawn without splitting the mold.

A parison pin is mounted in the machine in parallel with the machine axis and at the same distance from the machine axis as the mold axis for movement relative to the mold axis. The pin is rotated about the machine axis in order to align the pin with one or the other of the cavities and is reciprocated along one or the other mold axes with which it is aligned. A parison may therefore be formed over the parison pin in the injection mold and be transferred on the pin between the injection mold and the blow mold.

A set of split neckring segments are positioned coaxially of the parison pin for movement with the pin relative to the respective molds. The segments also move radially of the parison pin between the closed position in which the segments cooperate with the pin to define a neck portion of the parison and container, and an open position in which the formed container is released from the segments after a blowing operation. In accordance with the present invention, the segments also cooperate with the molds during blowing operations by defining the portion of the container between the neck and the mouth of the mold. By utilizing the neckring segments in this manner with molds having the cross sections as defined above, it is not necessary to split the blow mold to remove the blown container and thus a non-splitting mold may be used to define the blow cavity.

The injection-blow molding process is also improved by pre-blowing the parison during the interval in which the parison is removed from the injection mold and transferred to the blow mold. The settable material forming the parison is maintained in at least a partially plastic state and a limited quantity of air is injected through the parison pin to release the parison partially from the pin. When so released, the parison acquires a more uniform temperature distribution and a more uniform expansion of the parison results during the final blowing operation.

DESCRIPTION OF THE PREFERRED EMBODIMENTS

Figure 1:
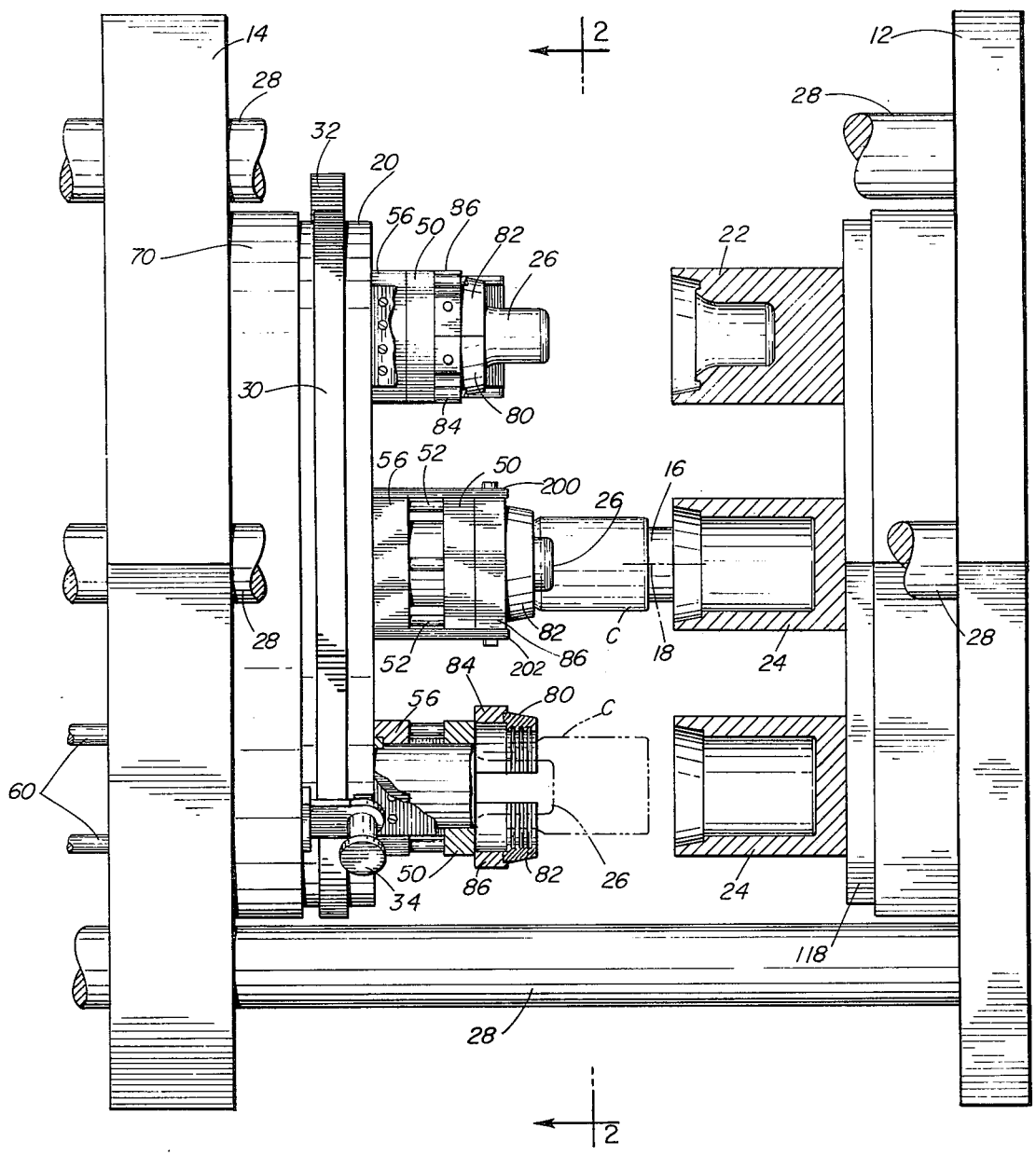
FIG. 1 is an elevation view of the injection-blow molding machine in the open condition during which parisons are transferred from the injection mold to the blow mold and blown particles are ejected.

FIG. 1 illustrates the general configuration of the injection-blow molding machine, generally designated 10, of the present invention. The machine includes a first stationary platen 12 and a second parallel platen 14 which is reciprocated toward and away from the platen 12 in conjunction with a central spindle 16 defining the principal axis 18 of the machine perpendicular to the parallel platens. Mounted on the second platen 14 is still another or third platen 20 which reciprocates with the platen 14 and which also rotates about the axis 18 relative to the platens 12 and 14. A plurality of tie bars 28 extend in parallel relationship with the spindle 16 between the platens 12 and 14 and are connected with pneumatic or hydraulic actuators (not shown) to reciprocate the platens 14 and 20 relative to the platen 12.

A plurality of injection molds 22 and blow molds 24 are mounted in evenly spaced relationship about the axis 18 of the machine 10 on the stationary platen 12. Each injection mold is arranged diametrically opposite a blow mold so that one or more pairs of injection and blow molds are situated on the platen. The mouths of the mold cavities open or face in the same direction and are situated in the same general plane perpendicular to the machine axis 18.

A corresponding plurality of parison pins 26 are mounted on the platen 20 to cooperate with the injection and blow molds 22 and 24 on the platen 12. Thus, when the platens 20 and 14 are moved toward the platen 12, each of the parison pins is situated in axial alignment with the axis of the mold cavity in a respective one of the injection or blow molds 22 or 24. As shown, for example, in FIG. 2 there are four parison pins 26 evenly distributed about the spindle 16 and these parison pins mate with two pairs of diametrically opposite injecton and blow molds on the platen 12. By rotating the platen 20 180° relative to the platen 14 when the platens 12 and 14 are spaced as shown to open the molds, parisons formed in the injection molds can be transferred to the blow molds and finished articles such as the containers C can be ejected from the machine into a cullet chute or other collecting device for receiving the molded articles.

Along the periphery of the platen 20 is a ring gear 30 which is engaged by a corresponding pinion gear 32 connected with a motor (not shown) mounted on the reciprocating platen 14. The ring gear 30 and pinion gear 32 produce relative rotation of the platens 14 and 20 when the parisons are to be transferred to the blow molds 24. To insure that the parison pins 26 are properly aligned with the cavities in the respective molds, a pneumatically operated lock pin 34 is provided to engage corresponding detents 36 spaced 180° in the periphery of the rotatable platen 20.

Figure 3:
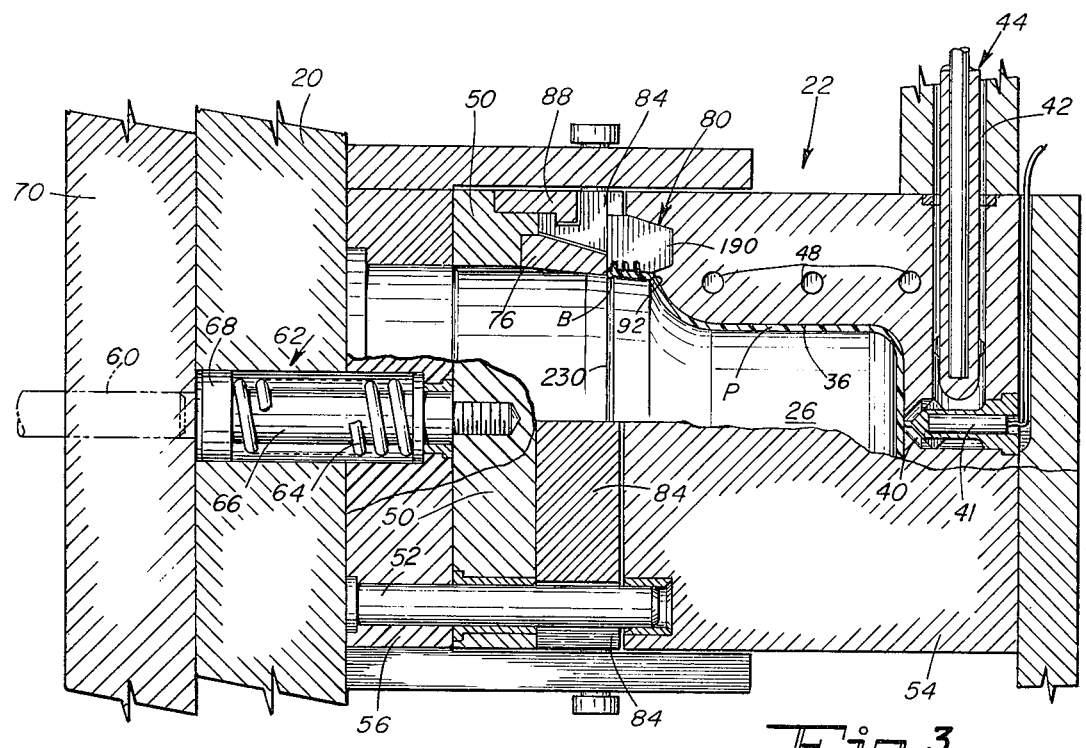
FIG. 3 is a cross sectional view of the injection mold with the parison pin in the closed position.
Figure 4:
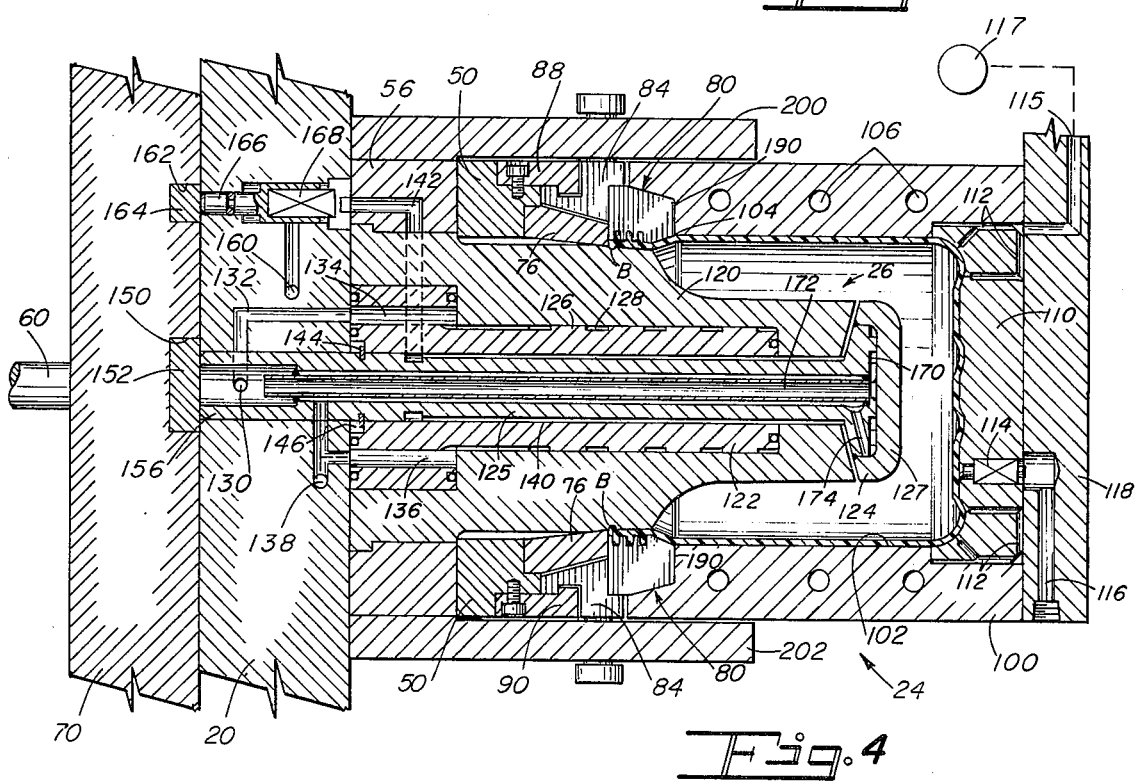
FIG. 4 is a cross sectional view of the blow mold with the parison pin in the closed position and shows the parison blown to the final form of the container defined by the mold.

A more detailed explanation of the injection and blow molding process and the respective molds is provided in connection with FIGS. 3 and 4.

FIG. 3 illustrates one of the injection molds 22 in section mounted on the platen 12. The mold 22 has an injection cavity 36 defining the general contour of a parison P to be formed over the parison pin 26 when the pin has been moved into the cavity and the mold has locked up. Within the base of the mold is an injection nozzle 40 through which a charge of settable plastic such as polypropylene or polyethylene is injected under pressure into the mold cavity over the parison pin. The settable material is delivered to the nozzle 40 by means of a passageway 42 in which an electrical heating rod 44 is mounted to hold the settable at a described elevated temperature prior to injection. An electrically heated torpedo 41 is also mounted within the nozzle 40 to maintain the temperature of the settable material as it enters the injection cavity. If desired, heating conduits 48 may be provided within the walls of the injection mold 22 to control the temperature of the settable material after injection and prior to transfer of the parison to the blow mold 24.

The parison pin 26 is connected with the rotatable platen 20 by means of a stripper plate 50 and four guide pins 52 anchored in the platen. The stripper plate reciprocates relative to the rotatable platen 20 on the guide pins 52 which extend parallel to the mold axis into the housing 54 defining the injection mold cavity 36 when the mold is closed and locked up. The pins 52 are distributed equally about the parison pins as shown most clearly in FIG. 2.

The movement of the stripper plate 50 relative to the platen 20 is controlled by positioning means including a pair of knockout rods 60 (only one shown in phantom) and an associated pair of spring return assemblies 62. The knockout rods 60 extend through the mounting plate 70 which is fixedly secured to the reciprocating platen 14 as shown in FIG. 1 and provides a mount for the rotating platen 20. The knockout rod 60 is shown in phantom in FIG. 3 because the rods are actually situated in the mounting plate 70 at opposite sides of the projected axis of the blow mold illustrated in FIG. 4. The knockout rods are brought into alignment with the respective spring return assemblies by rotation of the platen 20 when the assemblies and associated parison pin are brought into a position over or in alignment with the blow mold in FIG. 4. For ease of illustration and explanation, however, the rods are shown with the return assemblies and the stripper plate in FIG. 3.

Each spring return assembly 62 is comprised of a return spring 64 and a return rod 66. The return rod 66 is fixedly secured at one end in the stripper plate 50 and is provided with a head 68 at the opposite end. The return spring 64 is mounted coaxially about the rod 66 within a cylindrical bore extending through the platen 20 and into the base plate 56. The knockout rods 60 also extend through the platen 14 in FIG. 1 and connect with pneumatic actuators (not shown) for movement of the stripper plate and stripping of a finished container from the parison pin after a blow operation.

A more detailed explanation of the stripping operation is provided below; however, it will be noted that the knockout rod 60 and the return assembly 62 have adjacent abutting surfaces and establish a severable connection between the pneumatic actuators behind the platen 14 and the stripper plate 50, and such connection permits the parison pin 26 and platen 20 to be indexed between the injection and blow molds without corresponding indexing of the knockout rods 60 and actuators which operate such rods.

Connected to the stripper plate 50 is a stripper ring 76 which surrounds the parison pin 26 in close fitting relationship and which defines the finish of the parison P at one axial end face of the ring. The close fitting relationship of the stripper ring 76 and the parison pin 26 is selected to allow the stripper ring to slide over the parison pin and remove the blown container from the pin subsequent to the blowing operation.

Figure 2:
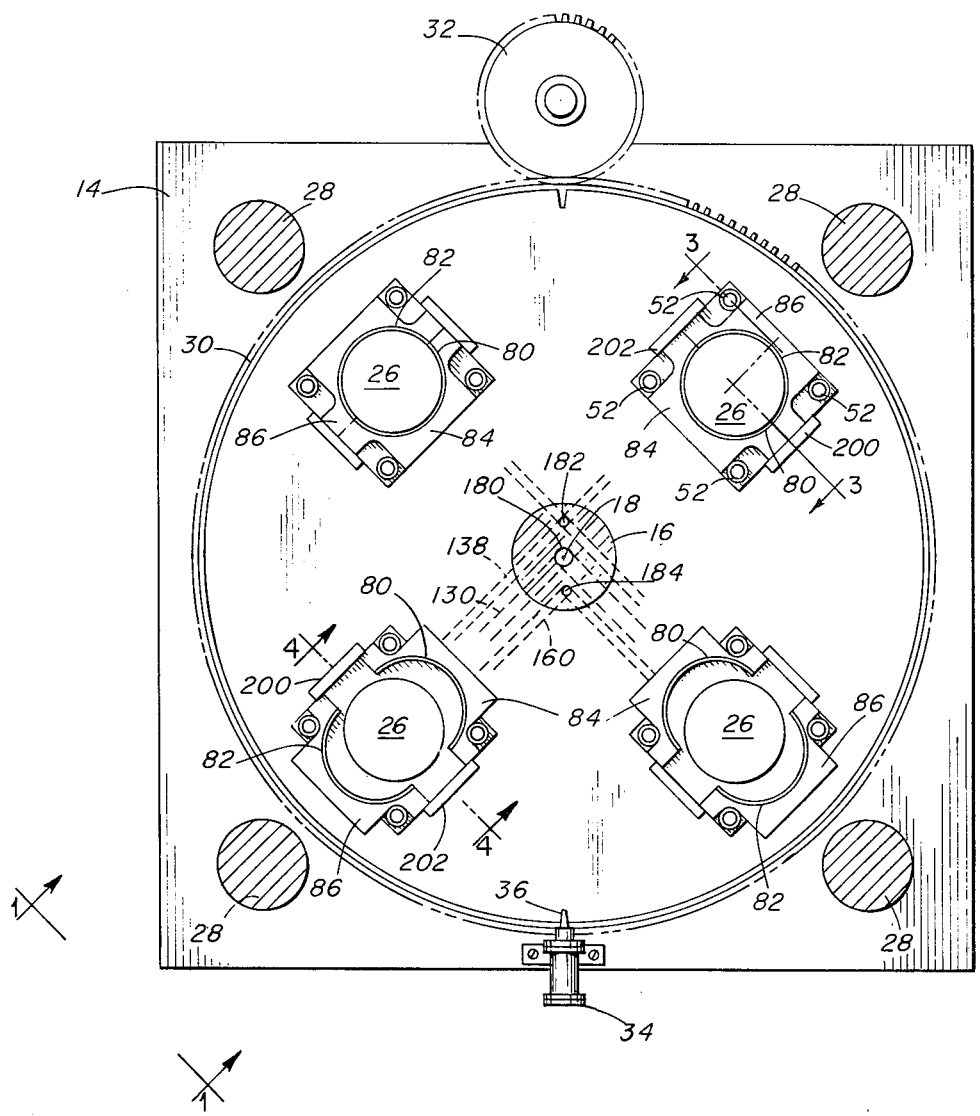
FIG. 2 is a section view of the molding machine as viewed along the sectioning line 2—2 in FIG. 1 and rotated 45° as indicated by the sectioning line 1—1 in FIG. 2.

The neckring segments 80 and 82 also shown in FIGS. 1 and 2 are connected to the stripper plate by means of neckring slides 84 and 86 respectively and define the portion of the parison between the finish and the mouth 92 of the injection cavity 36. The slides are suspended from the stripper plate 50 by means of mating tracks 88 and 90 shown in FIGS. 3 and 4 so that the slides and their associated neckring segments may move perpendicular to the axis of the parison pin 26. The slides move the neckring segments between a closed position in which the neckring segments completely envelop the enlarged portion of the parison pin defining the neck portion of the parison and the finished container and an open position which permits the finished container to be released and stripped from the parison pin. Thus, the neckring segments cooperate with the parison pin to form a part of the parison and container and to hold the parison on the pin as the parison is transferred between the injection and blow molds. A mechanism for opening and closing the neckring segments is discussed in greater detail below in connection with FIGS. 5 and 6.

FIG. 4 illustrates the details of the blow mold and the internal construction of the parison pin 26. The housing 100 of the blow mold 24 has a blow cavity 102 defining the final configuration of the blown container C except for the portion of the container between the finish and the mouth 104 of the cavity. The housing contains cooling passages 106 to control the temperatures of the mold and set up the material of the blown container following a blowing operation. A bottom plate 110 of the mold housing contains a plurality of vent passages 112 to permit any air captured in the cavity 102 during the blowing process to escape. Thus, the parison expands into contacting relationship with the cavity at all portions of the cavity wall and assumes a true configuration defined by the cavity. The vent passages are interconnected by grooves in the plate 110 and connect with a vent passageway 115 in the mold plate 118. If desired, a vacuum pump and accumulator 117 may be utilized to rapidly remove air from the blow cavity 102 before the blowing operation is completed.

A relief valve 114 is also mounted on the bottom plate 110 and is connected through a conduit 116 in the mold plate 118 to a vent port to relieve any vacuum produced during withdrawal of the container, or to a source of air pressure to eject a blown container C from the housing 100 at the end of the blowing operation. It will be understood that in the absence of the passages 112 and the relief valve 114, a vacuum or reduced pressure could be generated and inhibit removal of the container from the cavity 102 following a blowing operation.

The parison pin 26 has a multi-piece construction as shown in FIG. 4 including an outer sleeve 120, an inner sleeve 122 and an extendible tip 124. The inner sleeve 122 bears a plurality of lands 126 and grooves 128 on its outer surface which define a continuous heating passage within the bore of the sleeve 120 for circulating a heated fluid such as hot oil through the pin. Heating of the pin holds the elevated temperature of the parison during transfer to the blow mold so that the settable material remains in a softened state suitable for expansion against the cooler walls of the blow cavity 102. Heated fluid is pumped to the parison pin through a supply conduit 130 in the platen 20 and flows through an auxiliary pasageway 132 and a connecting passageway 132 in the base plate 56 into the heating passageway defined by the lands 126 and grooves 128. After the fluid has circulated around the inner sleeve 122, it exits through a passageway 136 into a discharge conduit 138 within the platen 20.

The extendible tip 124 has a hollow stem 125 leading from the platen 20 through the inner sleeve 122 to the generally mushroom-shaped head forming the tip. Since the extendible tip 124 also makes contact with a portion of the parison, circular heating passages 170 are formed in the tip under a cap piece 127. A heated fluid supply tube 172 is welded within the hollow stem at each end. The outer diameter of the tube is smaller than the inner diameter of the bore through the stem to define an annular fluid return passage. This passage connects at the tip end with the passages 170 by means of a radial passage 174 and at the opposite end with the discharge conduit 138 within the rotatable platen 20. Thus, heated fluid entering the pin from the conduit 130 circulates through the staionary portion of the parison pin around the sleeve 122 and also through the extendible tip 124 before returning to the conduit 138.

The hollow stem 125 is mounted in sliding relationship within the sleeve 122 and bears on its outer surface a plurality of splines 140 and grooves which extend from an air passageway 142 in the base plate 56 to the projecting end of the stem. The spline and grooves define air passages for the blow air. A snapring 144 engaging the sliding stem is located in an annular recess 146 within the sleeve 122 and limits the axial extension of the stem and the tip when blow air is delivered under pressure through the passageway 142. With the tip extended, blow air flows over the tip and between the parison and pin 26 to expand the parison against the walls of the blow cavity 102.

Figure 11:
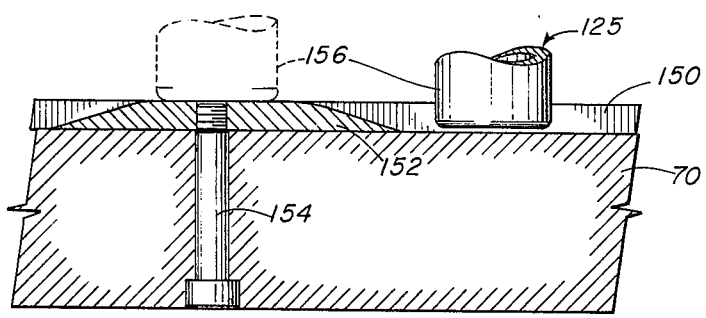
FIG. 11 is a fragmentary view showing the camming mechanism for extending the parison pin in a blow operation.

An annular groove 150 is provided in the mounting plate 70 and is located coaxially about the machine axis 18 in FIG. 1. A cam block 152 is located in the groove 150 by suitable bolts as shown most clearly in FIG. 11 at a location in alignment with the axis of the cavity 102 in the blow mold 24 so that the end 156 of the stem 125 is lifted by the cam block as the parison pin 26 with a parison mounted thereon is indexed with the platen 20 into a position in preparation for insertion into the blow mold 24. Engagement of the cam block 152 and end 156 causes the tip 124 to extend and open the air passageways defined by the splines 140 along the stem 125. Such extension also slightly stretches the parison immediately prior to the blowing operation.

Blow air is introduced into the parison pin 26 through the passageway 142 from an air conduit 160 connected in common with each of the parison pins mounted on the rotating platen 20. To prevent blow air from reaching parison pins other than those which are in the blow molds, another cam groove 162 and a cam block 164 similar to the groove 150 and cam block 152 are provided in the mounting plate 70 and engage the actuating stem 166 of a poppet valve 168 within the platen 20. The poppet valve 168 is moved to the open position in the same manner, and at the same time as the stem 125 is extended. That is at the time when the parison pin 26 moves into alignment with the axis of the blow mold 24. A separate air valve (not shown) controlled in synchronism with the machine operations introduces blow air into the conduit 160 then through the valve 168, the passageway 142 and the grooves defined by the splines 140 and out into the region between the parison and the parison pin 26 to expand the parison into the final form of the container C defined by the cavity 102.

It should be noted that in contrast to the blow air, the heating fluid is circulated through all of the parison pins regardless of the positioning of the pins relative to the molds. As shown in FIG. 2, heating fluid is supplied to the conduits 130 for all of the pins 26 by means of a common fluid passageway 180 extending through the spindle 16 and the fluid is discharged from the conduits 138 by means of a common fluid passageway 182. The air supply conduits 160 of the parison pins 26 are connected with a common air passageway 184 in the spindle. As illustrated most clearly in FIG. 4, the fluid supply conduits 130, the fluid return conduits 138 and the air supply conduits 160 are located respectively at different levels within the rotatable platen 20 to avoid interference.

Having defined the general operation and configuration of the injection blow molding machine 10, the remaining structure of the machine is described in conjunction with a typical machine cycle in which a parison is formed in the injection mold then transferred to the blow mold where it is expanded to its final form and ejected from the machine.

At the beginning of a machine cycle, the rotatable platen 20 and mounting plate 70 are spaced from the stationary platen 12 as shown in FIG. 1 to define an open position for each of the injection and blow molds. One of the parison pins 26 is located in axial alignment with the axis of an injection mold 22. The stripper plate 50 is retracted against the base plate 56 by means of the pair of spring return assemblies 62, and the neckring segments 80 and 82 are closed about the parison pin as shown generally by the two sets of neckring segments in the upper half of the machine in FIG. 2.

Hydraulic or pneumatic actuators connected with the mounting plate 70 move the platen 20 toward the stationary platen 12 to place one of the parison pins 26 in an injection mold in the position illustrated in FIG. 3. It will be noted that the neckring segments have a tapered annular portion 190 which engages a correspondingly shaped annular recess surrounding the mouth 92 of the cavity 36 in the injection mold 22. The radially inner and radially outer conical surfaces on the tapered annular portion 190 and the corresponding conical surfaces in the groove of the injection mold determine the final position of the neckring segments and thus hold the segments in the fully closed position when the mold is locked up.

A fast setting plastic material is then injected at an elevated temperature through the nozzle 40 into the injection cavity 36 over the parison pin 26 to form the illustrated parison P. It should be noted that the mouth 92 of the injection cavity is situated along the radially inner conical surface of the projecting portion 190 and that each transverse cross-section of the cavity perpendicular to the cavity axis is no larger than the other transverse cross-sections lying between the individual cross-sections and the mouth 92.

Accordingly, the housing 54 of the injection cavity need not be split to remove the parison P after injection and thus, the housing can be defined by a single mold piece. Elimination of a mold-splitting mechanism is an obvious advantage and construction of the mold cavity from a single or minimal number of pieces insures more uniform heat transfer and temperature distribution throughout the mold.

When the parison pin 26 with a parison thereon has been withdrawn from the cavity, the motor (not shown) connected with the pinion gear 32 and the ring gear 30 is energized and the platen 20 is rotated with the spindle 16 180° about the machine axis 18 to bring the parison pin into alignment with the axis of a blow mold 24. As the parison pin is brought into position, the cam block 152 extends the tip 124 of the pin and the cam block 164 opens the air valve 168 in preparation for a blow operation. The parison pin is then inserted with the parison into the blow mold by moving the platen 14 (FIG. 1) toward the platen 12 and the mold is locked up. It will be noted that the outer conical surface on the projecting portion 190 of the neckrings engages a mating conical surface defined by a groove circumscribing the mouth 104 of the blow mold. Again, the projecting portion 190 and the mating groove in the mold define the final positioning of the neckring segments about the parison pin during mold lockup.

Blow air is then introduced through the valve 168 into the parison pin and expands the lower portion of the parison against the walls of the blow mold cavity 102.

It will be noted that although the configuration of the blow mold cavity 102 is different from that of the injection mold, the transverse cross-sections of the cavity at each point along the cavity axis are no larger than the transverse cross-sections between the mouth 104 of the cavity and the section in question. Thus, like the injection mold, the sidewalls of the blow mold need not be split to remove a blown container from the cavity, and therefore, the sidewalls may be formed from a single mold piece. While the bottom portion of the blow cavity 102 is defined by a separate bottom plate 110, the entire cavity could be defined by a single mold piece if desired.

Since the neck of the blown container C is narrower than the body portion, the radially inner conical surfaces on the projection 190 of the neckring segments define a conical shoulder on the container between the mouth 104 and the contiguous portion of the neck formed on the parison pin 26. To permit the use of a single mold piece to define the sidewalls of the blow mold 24, the neckring segments 80 and 82 define the entire contour of the container between the mouth 104 and the finish of the neck abutting the stripper ring 76. Such construction results in a simplified mold construction having non-splitting molds on both the injection and blow sides of the machine.

Once the parison has been blown to the final configuration of the container C, the walls of the container set rapidly due to cooling of the housing 100 and the container is prepared for ejection from the mold and the machine. To eject the container, the platen 14 is drawn away from the platen 12 as in FIG. 1 and the neckring segments 80 and 82 are moved radially outward away from the parison pin. The stripper ring 76 is then moved axially over the pin to remove the neck of the blown container from engaging relationship with the pin.

Figure 5:
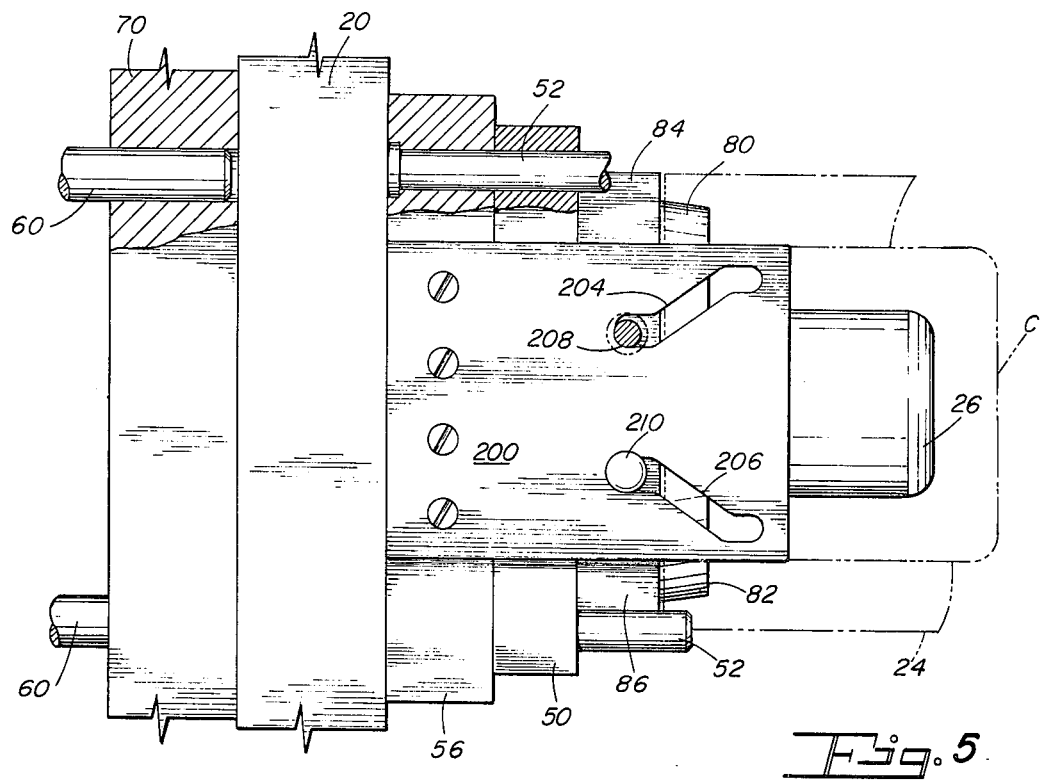
FIG. 5 is a fragmentary view showing a portion of the actuating mechanism for opening and closing the neckrings with the mechanism and the neckrings in the closed position.
Figure 6:
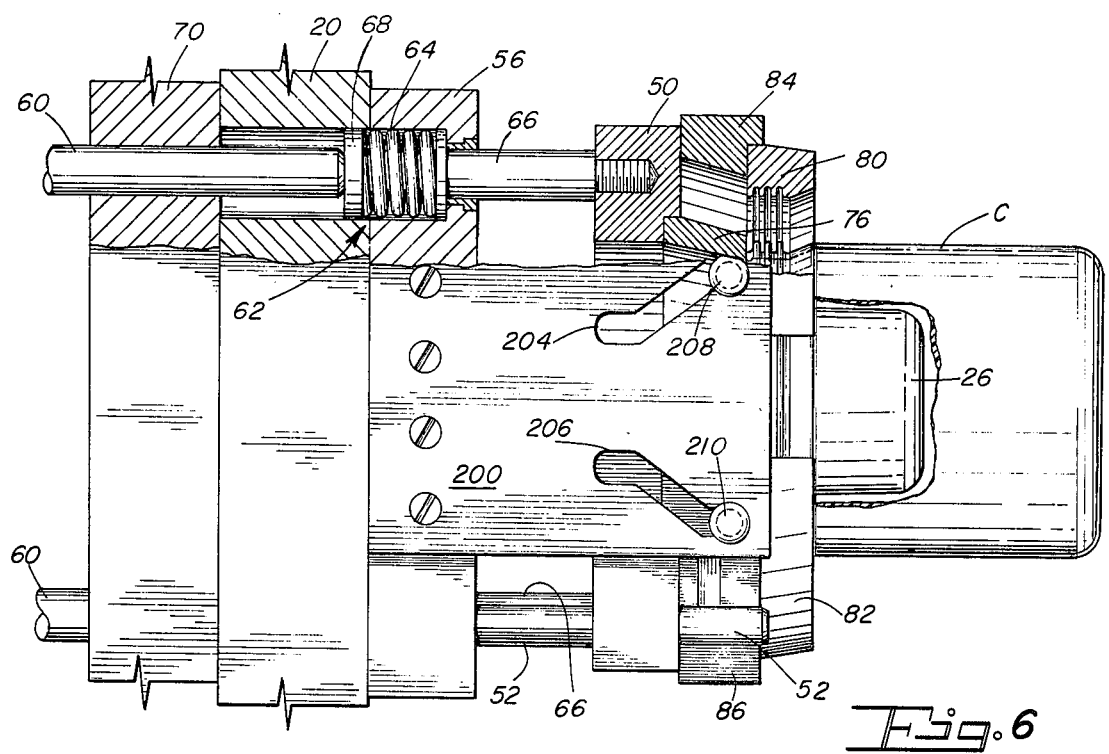
FIG. 6 is a fragmentary view showing the neckrings and the actuating mechanism in the open position for ejecting a blown article from the apparatus.

FIGS. 3-6 illustrate one mechanism by which the neckrings are opened in conjunction with the stripping operation. Attached to opposite sides of the mounting plate 56 are cam plates 200 and 202 respectively. Each of the cam plates has the same construction and hence only one of the plates is described below. A pair of Y-shaped camming slots 204 and 206 shown most clearly in FIGS. 5 and 6 are cut through the plates and a corresponding pair of cam followers or stub shafts 208 and 210 extend through the respective slots from the neckring slides 84 and 86, respectively. A similar set of stub shafts engage the cam slots in the plate 202 at the opposite side of the neckring slides.

The neckring segments 80 and 82 and corresponding slides 84 and 86 are in the closed position when the stripper plate 50 is resting against the mounting plate 56 as shown in FIGS. 3, 4 and 5. In the closed position, the stub shafts 208 and 210 rest in the proximate ends of the camming slots 204 and 206 closest to the mounting plate 56. Preferably the stub shafts fit in the slots in loose fitting relationship at this position so that the conical surfaces on the tapered annular projection 190 defined by the neckring segments and the corresponding conical surfaces in the injection and blow molds may engage and establish proper positioning of the rings to prevent the formation of an undesirable mold flash or discontinuity in the finished container at the mouth of the molds and at the parting plane of the neckring segments 80 and 82.

To release to the blown container from the neckring and strip the container from the parison pin 26, the two knockout rods on diametrically opposite sides of the mold axis are extended from the position shown in the mounting plate 70 in FIG. 5 through the platen 20 to the position shown in FIG. 6 and thus pass through the parting plane or plane of rotation between the mounting plate 70 and the rotating platen 20 to extend the rods 66 and compress the return springs 64. The stripper plate 50 and the stripper ring 76 are displaced away from the base plate 56 as shown in FIG. 6 which causes the neck of the container to be removed from the enlarged portion of the parison pin 26. At the same time, the neckring segments 80 and 82 and slides 84 and 86 are spread by the remote ends of the camming grooves 204 and 206 and stub shafts 208 and 210 and release the engagement with the neck and shoulder of the container to thusly permit the container to fall freely from the machine into a cullet or other collection chute. The operation of the knockout rods 60 is controlled by a suitable actuator synchronized with the cyclic operation of the molding machine 10 to open the neckring segments and strip the container after the container has been withdrawn from the blow mold.

To ensure that the molded container C falls away from the parison pin 26 when the blow mold 24 is opened and the article is withdrawn, a strong blast of air or other gas may be directed from the conduit 160 through the valve 168 and out through the parison pin 26 into the cavity of the container C. Pressure developed by the blast of air tends to blow the container away from the pin and the neckrings. To develop higher pressures which produce a blast of air sufficient to move the container off the pin, it is desirable to bypass regulators and valves establishing a more limited flow of air to the conduit 160 during the blowing operation when the parison is expanded against the walls of the blow mold 24.

It has been found in actual practice that the higher pressures developed within the conduit 160 to blow a container C away from the parison pin after the blow mold is opened also partially open or leak past the non-actuated poppet valve 168 associated with a parison pin situated over an injection mold 22 when the molds are opened. Such leakage of air past the valve 168, of course, initiates blowing of the parison because the settable material forming the parison is held in at least a partially plastic state by the heating fluid circulated through the parison pin. This limited degree of pre-blowing, that is, blowing of the parison after it has been removed from the injection mold 22 and before it has been placed in the blow mold has been found to be advantageous since it separates the parison partially from the parison pin and allows the parison to develop a more uniform temperature. Thus, during a blowing operation a more uniform expansion of the parison against the walls of the blow mold is experienced and a more uniform wall thickness is obtained. It will be recognized that the quantity of pre-blow air directed into the parison can be controlled by setting the compression of the spring in the poppet valve 168 which establishes a pre-defined differential between the pressure of the blow air and the pre-blow pressure which removes a container C from the parison pin 26 when the molds are opened.

After the container C has had an opportunity to fall away from the neckring segments, the knockout rods 60 are withdrawn from the rotatable platen 20 and the return springs 64 and rods 66 move the stripper plate back to the position shown in FIG. 5. At the same time the stub shafts 208 and 210 move from the remote ends of the cam slots 204 and 206 respectively to the proximate ends, and the neckring segments 80 and 82 close out the parison pin 26. It is desirable to provide a limit switch to sense the return of the stripper plate 50 and the neckring segments to the FIG. 5 position to ensure that the knockout rods 60 are withdrawn from the platen 20 before the gears 30 and 32 in FIG. 2 are energized to rotate the platen 20 180° back to the starting position of the machine cycle.

Figure 7:
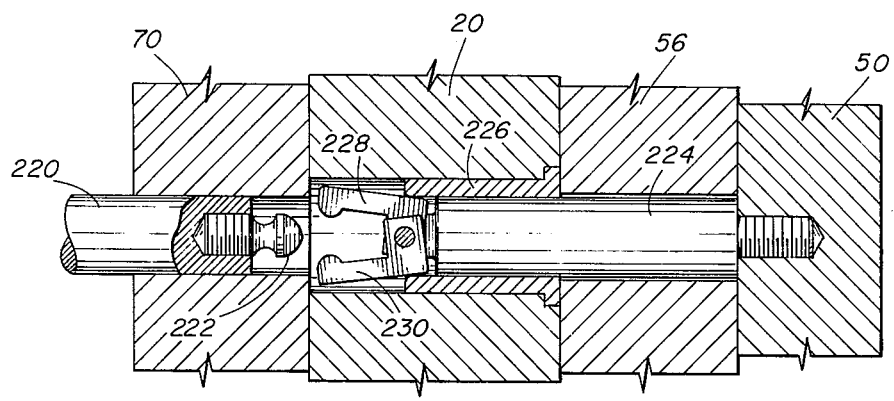
FIG. 7 is a fragmentary view showing an alternate embodiment of the knockout rods and the severable connection of the rods in the disengaged position.
Figure 8:
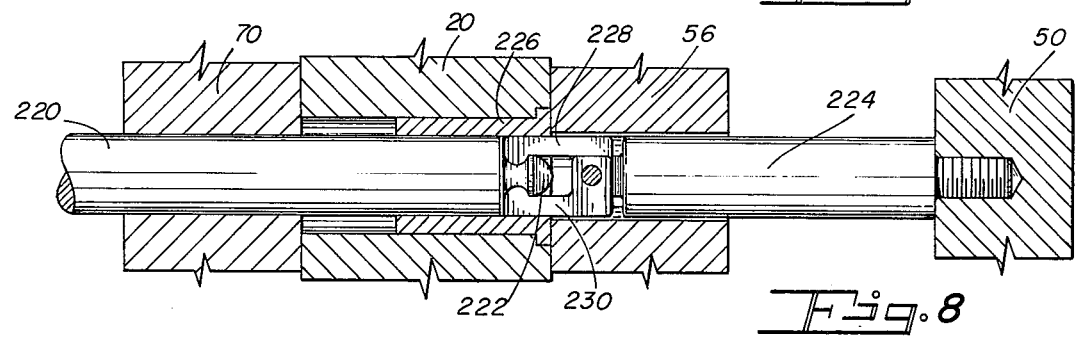
FIG. 8 is a fragmentary view showing the alternate embodiment of the knockout rods with the severable connection in the engaged position.

An alternate configuration for the knockout rods and the return rods is illustrated in FIGS. 7 and 8. The knockout rod 220 is located and operated in substantially the same manner as described in connection with FIGS. 3-6. However, a nipple 222 is connected to the end of the rod which moves through the interface between the mounting plate 70 and the rotatable platen 20. A return rod 224 is secured to the stripper plate 50 in the same manner as the return rod 66 and extends through the base plate 56 and into the platen 20 through a bushing 226. A pair of jaws 228 and 230 are pivotally connected to the end of the rod 224 within the bushing and cooperate to engage the nipple 222 as shown in FIG. 8 when the nipple is pushed into the platen 20 and through the bushing 226. As the jaws 228 and 230 enter the bushing, they are forced to close about the nipple and thus the knockout rod 220 and the return rod 224 are securely attached to each other. When a stripping operation is complete, the knockout rod 220 pulls the return rod 224 and the stripper plate 50 back to the positions illustrated in FIG. 7 and when the stripper plate makes contact with the base plate 56, the jaws 228 and 230 open to permit further retraction of the knockout rod beyond the parting plane between the mounting plate 70 and the rotatable platen 20. The platen 20 may then be indexed without damage to the knockout rods.

Figure 10:
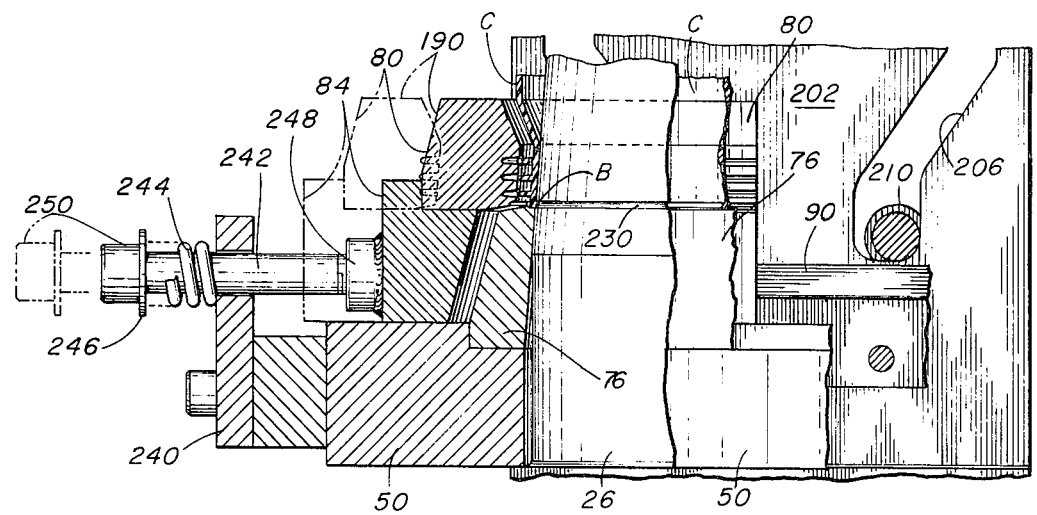
FIG. 10 is a sectional view of the biasing means as viewed along the sectioning line 10—10 in FIG. 9.
Figure 9:
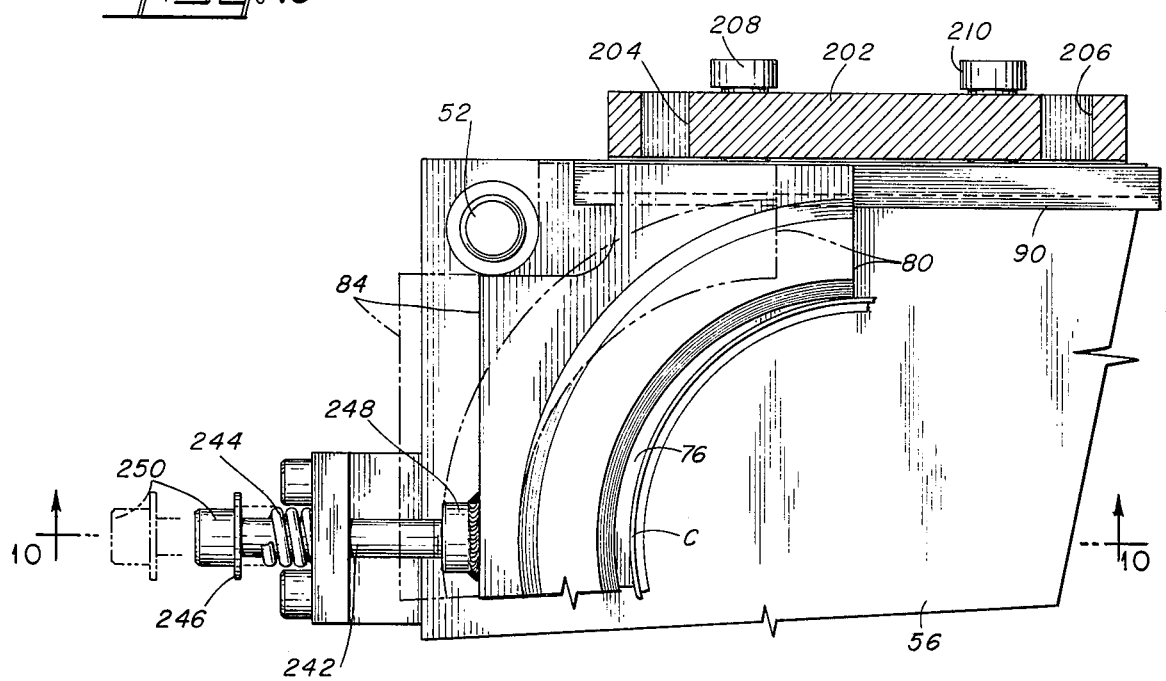
FIG. 9 is a fragmentary view showing the mechanism for biasing the neckring segments toward the open position when the blow mold is opened.

The blown container C may be provided with an interior bead B shown in FIGS. 3 and 4 if a sealing lid is to be snapped over the mouth of the container. Such bead is formed by a groove 230 around the enlarged portion of the parison pin 26. It will be understood that if the blown container is stripped from the parison pin without relaxing the closing forces applied by the neckring segments 80 and 82, the bead may be damaged or sheared from the container in the stripping process. Accordingly, mechanism illustrated in FIGS. 9 and 10 is provided for biasing the neckring segments incrementally toward an open position as soon as the tapered annular projection 190 on the neckring is removed from the mating annular groove in the blow mold 24.

As described above, the neckring slide 84 travels radially inward and outward of the parison pin 26 at one side of the mold on the tracks 88 and 90. Movement of the slide is controlled during ejection of a container C primarily by the stub shafts 208 and the camming grooves 204 in the camming plates 200 and 202 and the conical surfaces on the projection 190 of the neckring segment 80. However, biasing means formed by a bracket 240, a tension bar 242 and a biasing spring 244 interposed between the bracket and a washer 246 under the head 250 of the bar 242 operates to pull the neckring segments by a small amount away from the locked up position held by the projection 190 as illustrated in FIG. 4. The bar 242 extends through an aperture in the bracket 240 and is threadably connected to a boss 248 welded to the neckring slide 84. The bracket 240 is bolted or otherwise connected to the stripper plate 50 so that radially inward movement of the slide 84 caused by engagement of the neckring segment with the blow mold places the spring 244 in greater compression. Such compression is relieved slightly when the neckring segment 80 is disengaged from the mold and pulled by the bar 242 into the solid line position shown in FIGS. 9 and 10. The amount by which the neckring segments open is limited by the freedom of the loosely fitted stub shafts 208 and 210 in the proximate ends of the camming slots 204 and 206, and is selected to withdraw the ribs on the neck of the container C only partially from the corresponding grooves of the neckring segments. The container therefore remains captured on the parison pin. The segments are held in the solid line position by the stub shafts 208 and 210 until the stripper plate pushes the stub shafts upwardly to the more widely spaced remote ends of the camming grooves 204 and 206. With such movement, the neckring segments move radially outward to the open position illustrated in phantom in FIGS. 9 and 10.

Accordingly, as soon as the blowing operation is complete and withdrawal of the parison pin 26 from the blow mold is initiated, the biasing spring 244 cracks or opens the neckring segments slightly to relieve pressure on the internal bead B at the container finish. The stripper ring 76 then presses against the finish and compliance of the material allows the bead to slip out of the groove 230 and over the parison pin without damage. Special cooling of the neckring segments may also be provided to set the bead in the neck of the container before stripping. Of course, in molding containers without the internal bead, the biasing means is not needed.

Figure 12:
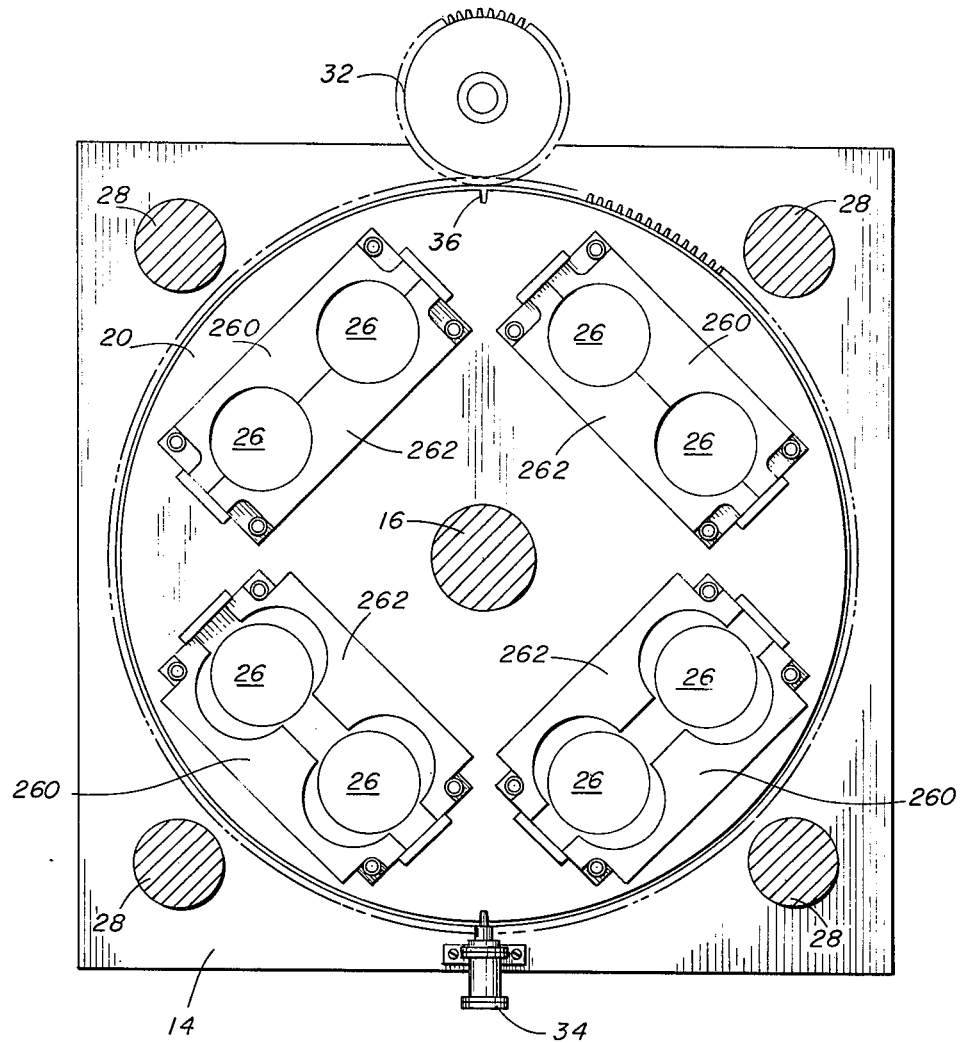
FIG. 12 is a sectional view similar to FIG. 2 showing an alternate positioning of parison pins for multiple injection and blow molds.

While the mold layout illustrated in FIG. 2 shows two pairs of diametrically opposed injection and blow molds, it is contemplated that multiple layouts may be employed for higher production rates. For example, FIG. 12 illustrates the layout of parison pins for a machine in which two pair of diametrically opposed dual injection and blow molds are employed. The parison pins 26 are grouped in pairs for cooperation with dual injection molds and dual blow molds, and the neckring segments (not shown) for each pin are carried in tandem on the neckring slides 260 and 262. Cam plate mechanisms similar to those illustrated and described in detail in connection with FIGS. 5 and 6 are utilized to open and close the neckring segments.

Figure 13:
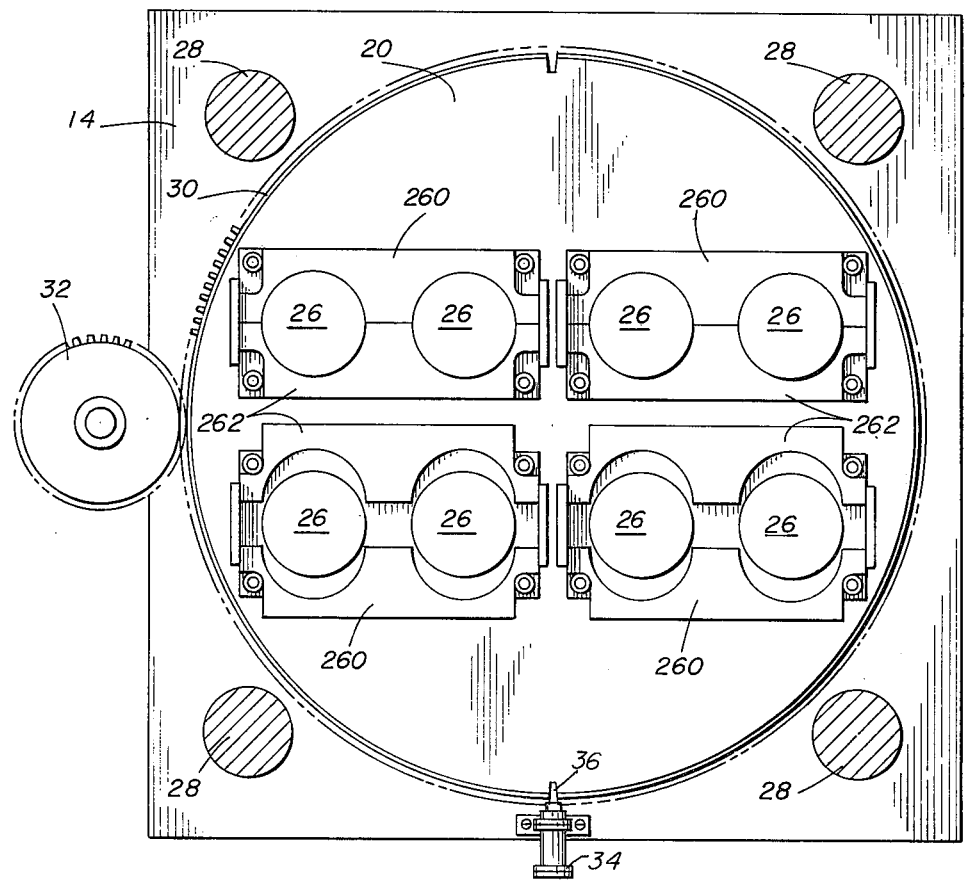
FIG. 13 is also a sectional view similar to FIG. 2 showing a still further arrangement of the parison pins for multiple injection and blow molds.

A still further arrangement of the parison pins 26 and cooperating injection and blow molds is suggested in FIG. 13. With this arrangement of the pins and the corresponding arrangement of the injection and blow molds, the tandem neckring slides 260 and 262 may also be utilized.

Accordingly, several preferred embodiments of an injection blow molding machine have been disclosed in which both the injection and blow cavities are constructed with non-splitting mold pieces permitting the use of a single mold piece if desired. In such constructions, the neckring segments are designed to define the configuration of the finished article or container between the mouth of the blow mold cavity and the finish of the container. With containers having a neck smaller in diameter than the body of the container, the neckring segments define the shoulder of the container between the neck and the mouth of the cavity. While the present invention has been described in several preferred embodiments, it will be understood that still further modifications and substitutions can be had without departing from the spirit of the invention. For example, the mechanical mechanisms including the cam plates which open and close the neckrings about the parison pins operate in a coordinated manner with the stripper plate 50; however, if separate hydraulic or pneumatic mechanisms are provided in place of the cam plates, coordinated opening of the neckrings and stripping of the parisons may be controlled by a machine timer which synchronizes the injecting, indexing, blowing, and stripping operations. It should also be understood that while it is advantageous to utilize a single mold piece to define both the injection and blow molds, the simplicity of the non-splitting design may still be enjoyed even when several different mold pieces are utilized in one or both of the molds. Thus, the present invention has been described in several preferred embodiments by way of illustration rather than limitation.

We claim:

1. An injection blow molding machine for forming a container having a neck dimensionally smaller than the body of the container comprising:

a first platen and a second platen supported in generally parallel relationship with each other;

means mounted in the machine operable to move one of the platens toward and away from the other;

means mounted in the machine operable to rotate one of the platens relative to the other about a machine axis perpendicular to the two platens;

an injection mold and a blow mold mounted on the first platen, with the mold axes parallel to and spaced equidistant from the machine axis and having mold cavities extending along the mold axes, the cavities having mouths at the openings of the cavities facing the second platen, bottoms of the cavities opposite the mouths and side walls extending between the mouths and the bottoms, at least the side walls of the mold cavities between the mouths and the bottoms of the cavities being formed by non-splitting mold portions secured to the first platen, the dimensions of the mouths of the cavities being at least as large as the parallel dimensions at any section of the respective mold cavities between the mouth and the bottom to allow a parison or blown container to be axially removed from the non-splitting molds through the mouths;

a parison pin for the molds mounted on the second platen projecting toward the first platen with the pin axis parallel to the machine axis and spaced from the machine axis by the same amount as the mold axes whereby rotation of the platens relative to one another brings the parison pin axis and one or the other of the mold axes into alignment and relative movement of the one platen toward and away from the other permits the parison pin to enter and withdraw from the openings of one or the other of the molds and thus a parison may be carried by the pin from the injection to the blow mold; and a set of split neckring segments mounted on the second platen about the parison pin and cooperating with the pin to define a neck portion of a container having dimensions perpendicular to the mold axis smaller than the corresponding dimensions of the container at the mouth of the cavity in the blow mold, the neckring segments being movable on the second platen relative to the parison pin between opened and closed positions to release the blown container, the segments cooperating with the injection mold to define the neck portion of the parison between the mouth of the injection mold and the finish of the parison and cooperating with the blow mold to define the narrower portion of the blown container between the mouth of the blow mold and the finish of the container whereby the neckring segment engaging a blown container at a blow mold remove the blown container from the mold when one of the platens is moved away from the other.

2. An injection blow molding machine as defined in claim 1 wherein:

the first platen is a stationary platen;

a spindle extends along and defines the machine axis and is both rotatable about the axis relative to the first, stationary platen and reciprocable along the axis relative to the first platen; and the second platen is mounted on the spindle.

3. An injection blow molding machine as defined in claim 1 further including:

a stripper plate mounted on the second platen for reciprocation toward and away from the second platen along the axis of the parison pin and having a ring circumscribing the pin and abutting the finish of the container; and drive means for reciprocating the stripper plate relative to the parison pin between a retracted position permitting a container to be held on the pin and an extended position in which the ring strips the formed container from the pin after a blow operation.

4. An injection blow molding machine as defined in claim 3 wherein:

a third platen is connected to reciprocate relative to first platen and is rotatably connected with the second platen at one side of the second platen opposite the parison pin and stripper plate to permit reciprocation and rotation of the second platen and the parison pin about the machine axis relative to the first and third platen; and positioning means for positioning the stripper plate extends from the third platen through the second platen to the stripper plate and includes two portions having a severable connection permitting one portion of the positioning means to remain in the third platen and the other portion to remain in the second platen when the second platen with the stripper plate and parison pin are rotated about the machine axis relative to the injection and blow molds.

5. An injection blow molding machine as defined in claim 4 wherein:

the positioning means includes a first rod mounted for reciprocation in the second platen and connected at one end with the stripper plate and having an opposite end supported in the second platen when the stripper plate is in the retracted position, and a second rod mounted for reciprocation in the third platen and having one end located adjacent said opposite end of the first rod at a pre-determined rotational position of the second and third platens and having an abutment surface for engaging and pushing said opposite end of the first rod; and the positioning means further includes resilient means mounted in the second platen and cooperating with the stripper plate for urging the plate into the retracted position when the second rod is withdrawn from engagement with the first rod and into the third platen to sever the connection between the rods.

6. An injection blow molding machine as defined in claim 4 wherein:

the positioning means includes first and second rods mounted for reciprocation in the second and third platens respectively, the first rod having one end engaged with the stripper plate and the opposite end adjacent the one end of the second rod, the adjacent ends of the rods having a nipple and nipple engaging jaws respectively forming the severable connection permitting the first rod and stripper plate to be reciprocated by the second rod.

7. An injection blow molding machine as defined in claim 3 wherein:

the set of split neckring segments are slidably mounted on the stripper plate for movement toward and away from the axis of the parison pin; and camming means are connected with the second platen and the neckring segments for closing and opening the neckring segments about the parison pin in conjunction with the reciprocation of the stripper plate toward and away from the second platen respectively.

8. An injection blow molding machine as defined in claim 7 wherein the camming means comprises a cam member having a camming groove and a cam follower member engageable with the groove, one of the members being mounted on the second platen and the other of the members being connected with the neckring segments.

9. An injection blow molding machine as in claim 8 wherein:
the cam follower member fits loosely in the camming groove of the cam member at the retracted position of the stripper plate in which the neckring segments are closed;
means are mounted on the stripper plate for biasing the neckring segments toward the opened position when the stripper plate is in the retracted position; and
the neckring segments and the blow mold bear mating conical surfaces which hold the segments in the fully closed position during mold lockup whereby the segments may open by an amount limited by the loosely fitting camming groove and cam follower member in response to the biasing means after mold release.

10. An injection blow molding machine as defined in claim 1 wherein:
the parison pin has an extendible tip and a reciprocable stem extends from the tip toward the second platen; and
camming means are provided for lifting the reciprocable stem and extending the tip of the parison pin as the pin is brought into alignment with the axis of the blow mold.

11. An injection blow molding machine as defined in claim 1 wherein:
the injection and blow molds are located on the first platen 180° apart about the machine axis; and
two parison pins are mounted on the second platen 180° apart about the machine axis for cooperation with the injection and blow molds.

12. An injection blow molding machine of the type in which a parison is formed by an injection molding process and the parison is formed into a container in a blowing process comprising:
a non-splitting injection mold and a non-splitting blow mold mounted in stationary relationship within the machine with the mold axes located in parallel relationship with and equidistant from another axis through the machine, the mold cavities being formed around mold axes and each having a mouth opening the cavity at one axial end, the side wall of each mold cavity being shaped so that the transverse cross sections of the cavity perpendicular to the mold axis at each point along the mold axis are no larger than the other transverse cross sections lying between the individual cross sections and the mouth of the cavity whereby a parison or container can be withdrawn from the cavity without splitting the mold, the injection mold having an annular recess circumscribing the mouth of the mold cavity and the blow mold having an annular groove surrounding the mouth of the mold cavity;
a parison pin mounted in the machine for rotation between positions in alignment with the mouths and axes of the mold cavities and for reciprocation in and out of the mold cavities whereby a parison may be transferred on the pin between the injection mold and the blow mold; and
a set of split neckring segments also mounted adjacent and positioned coaxially about the parison pin for movement with the pin relative to the respective molds, the segments also being movable relative to the parison pin between a closed position in which the segments cooperate with the parison pin and define a neck portion of a parison and container narrower than the mouth of the blow mold and an opened position in which a blown container is released from the segments and parison pin, the segments also including projecting portions that form an annular ring mating with and fitting in the annular recess and groove of the injection and blow molds respectively when the parison pin is inserted in the molds, the annular ring having a contoured inner surface defining a shoulder of the blown container between the mouth of the blow mold cavity and the narrower neck portion of the container and being exposed in the blow mold cavity by the annular groove when the parison pin is inserted whereby the neckring segments engaging a blown container at a blow mold remove a blown container from the mold when a parison pin is reciprocated out of the mold cavity.

13. An injection molding machine as defined in claim 12 wherein the contoured inner surface of the annular ring formed by the neckring segments is a conical surface.

14. An injection blow molding machine as defined in claim 12 wherein:
the parison pin includes fluid passageways within; and
a machine spindle extends coaxially along the other axis and is connected with the parison pin, and a plurality of fluid passageways for conducting a temperature controlled fluid extend through the spindle and communicate with the passageways within the parison pin for controlling the pin temperature.

15. An injection-blow molding machine as defined in claim 12 further including vacuum generating means connected with the cavity of the blow mold for evacuating air from the cavity during a blow operation.

16. An injection blow molding machine for forming a container having a neck dimensionally smaller than the body of the container comprising:
non-splitting injection and blow molds mounted within the machine defining mold cavities extending along corresponding mold axes and being generally disposed about the mold axes, the cavity of each mold having a mouth at an open end of the mold through which the molded article is removed from the mold and a bottom at the end of the cavity opposite the mouth with side walls of the cavity being disposed about the mold axis, the cavity cross sections perpendicular to the mold axis at each point between the mouth and the bottom of each cavity being at least as large as the other cross sections lying between the individual cross sections and the bottom of the cavity whereby the portion of a parison or container formed within a cavity can be withdrawn without splitting the mold;

a parison pin mounted in the machine for movement between positions in alignment with the mouth and axes of each mold cavity and for reciprocation in and out of the mold cavities from the aligned positions;

means mounted in the machine for moving the parison pin between the positions in alignment with the molds and for reciprocating the pin in and out of the molds whereby a parison may be transferred on the pin between the injection and the blow molds; and a set of split neckring segments positioned about the parison pin and mounted for movement with the pin relative to the injection and blow mold, the segments also being movable relative to the pin between a closed position in which the segments cooperate with the parison pin and define a neck portion of a container smaller than the mouth of the blow mold and an open position in which a blown container may be released from the segments and parison pin, the neckring segments also including portions that mate with the injection and blow molds and define the part of the blown container between the smaller neck and the mouth of the blow mold cavity whereby the neckring segments engaging a blown container at a blow mold remove a blown container from the mold when a parison pin is reciprocated out of the mold cavity.

* * * * *

UNITED STATES PATENT OFFICE
CERTIFICATE OF CORRECTION

Patent No. 4,076,484      Dated February 28, 1978

Inventor(s) Donald F. Armour and Bernie A. Olmsted

It is certified that error appears in the above-identified patent and that said Letters Patent are hereby corrected as shown below:

Col. 2, line 18 "cosntainer" should be --container--.

Col. 3, line 68 "injecton" should be --injection--.

Col. 4, line 35 after "settable" insert --material--.

Col. 4, line 35 "described" should be --desired--.

Col. 5, line 60 "temperatures" should be --temperature--.

Col. 6, line 28 "pasage-" should be --passage- --.

Col. 6, lines 29 and 30 "132 in the base plate 56" should be --134 in the sleeve 122--.

Col. 13, line 55 "segment" should be --segments--.

*Signed and Sealed this*

*Eleventh* Day of *July 1978*

[SEAL]

Attest:

RUTH C. MASON
*Attesting Officer*

DONALD W. BANNER
*Commissioner of Patents and Trademarks*